Patented June 21, 1932

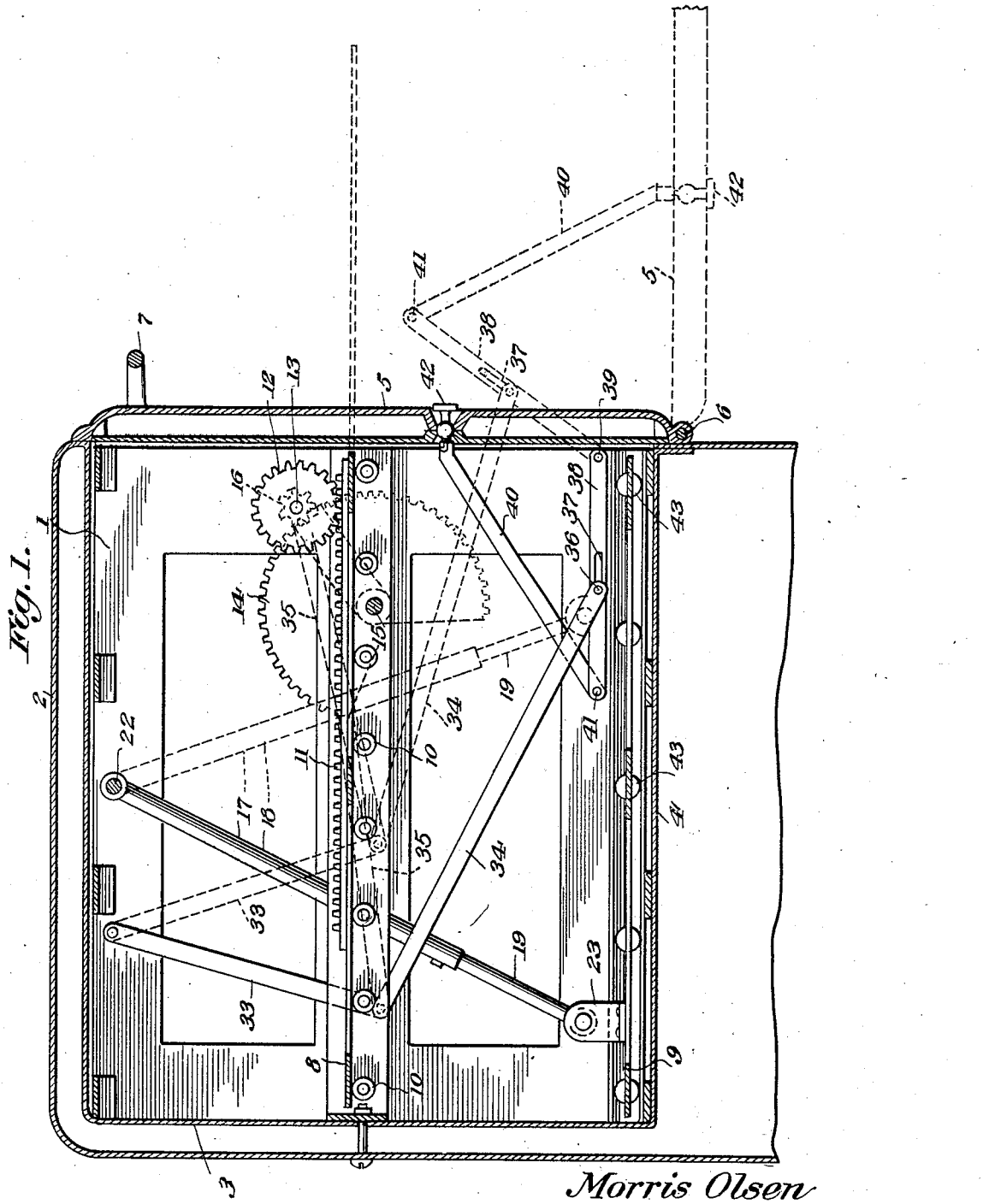

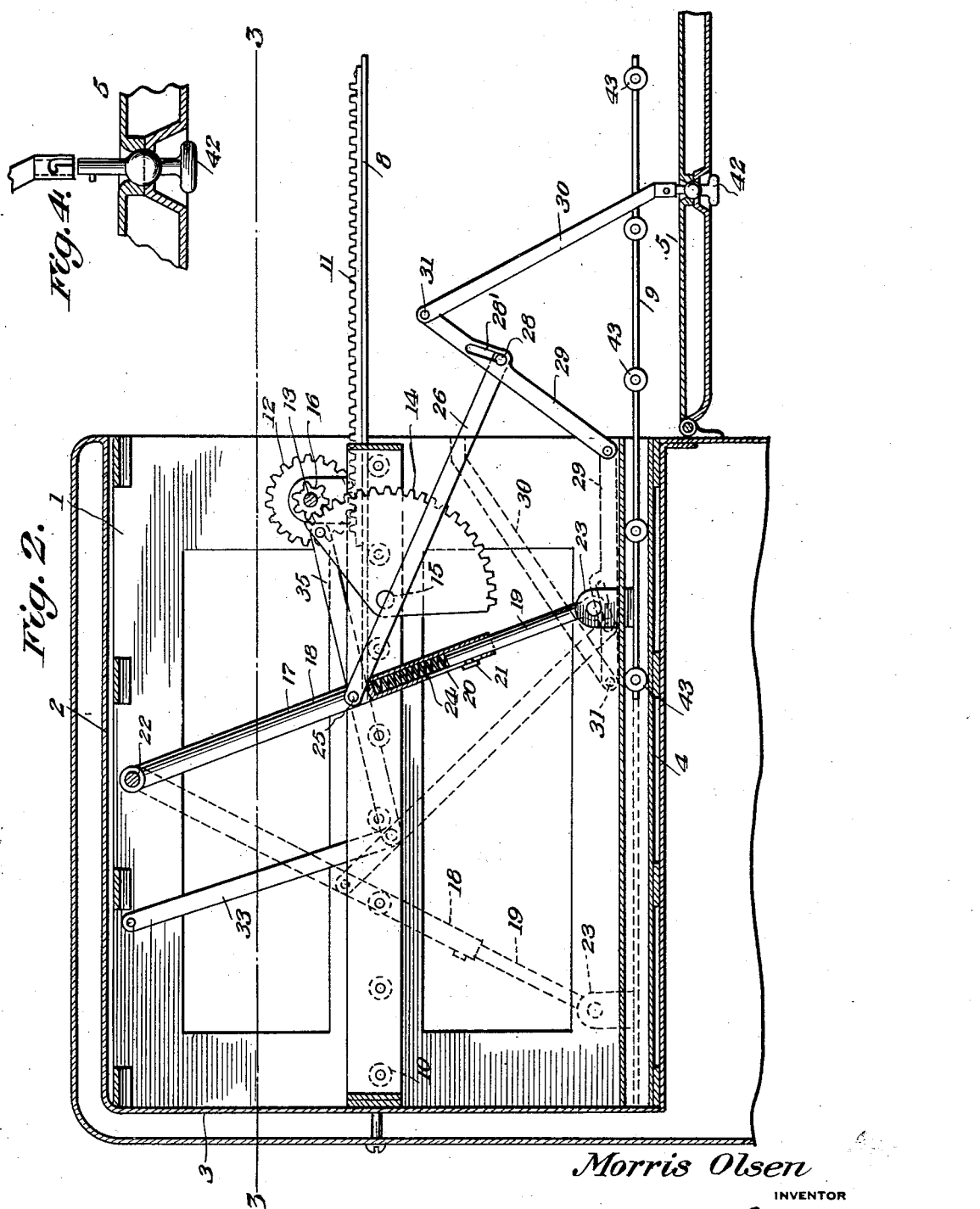

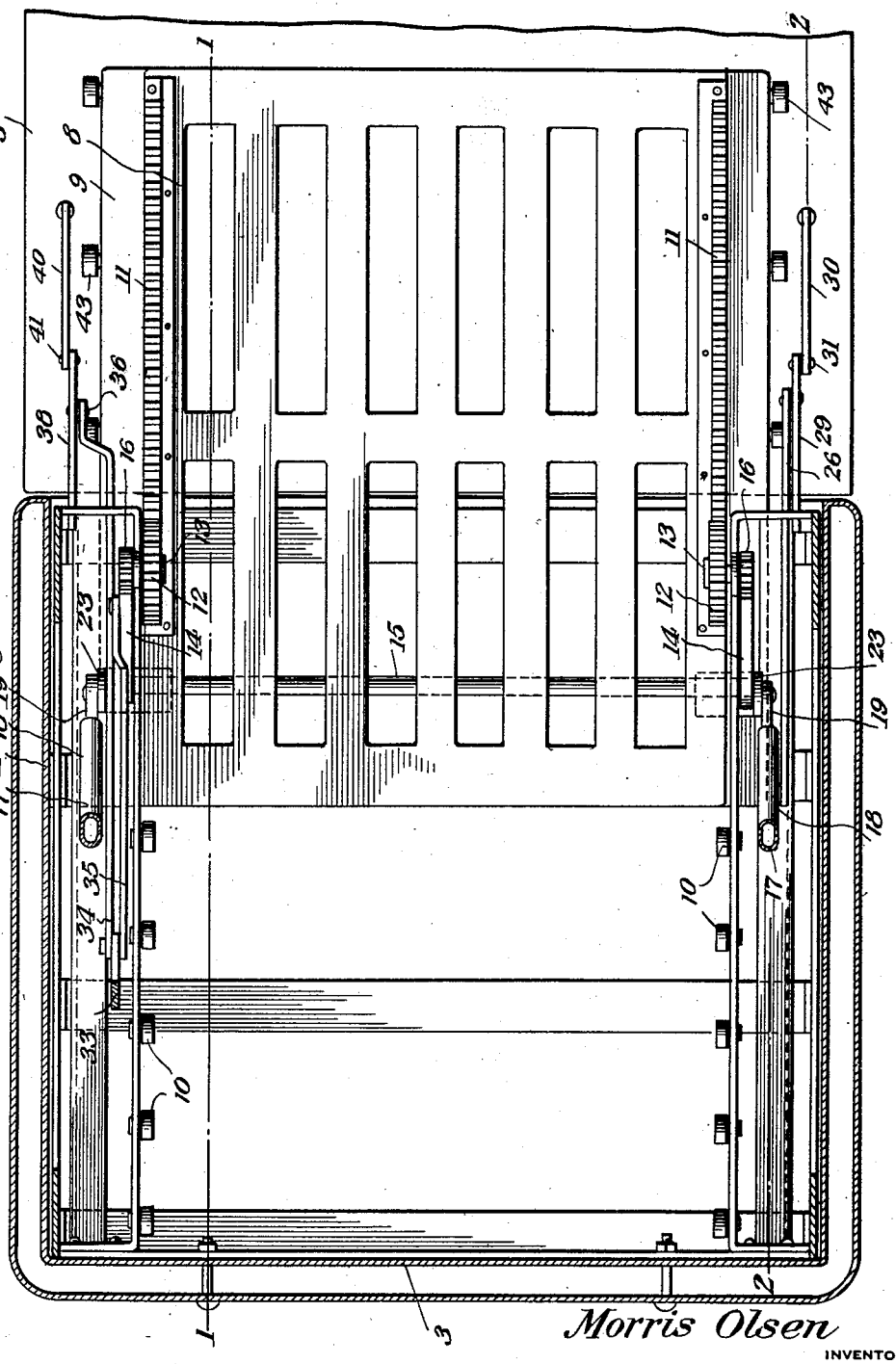

1,864,462

UNITED STATES PATENT OFFICE

MORRIS OLSEN, OF REVELSTOKE, BRITISH COLUMBIA, CANADA

BAKE-OVEN EJECTOR

Application filed June 22, 1931. Serial No. 546,076.

This invention relates to attachments for cooking ovens and more particularly to an improvement in baking ovens such as are employed in bakeries, and the primary object of the invention is to provide a novel and effective means whereby all of the shelves upon which loaves of bread or the like are placed for baking and from which they are removed after the baking operation, will be automatically shifted outwardly to a position substantially exteriorly of the oven, upon opening of the oven door and, returned to normal position when the oven door is closed. Therefore, the invention contemplates, in this connection, provision of a baking oven so constructed that by its use the process of baking can be more expeditiously carried out than has heretofore been possible where such shelves as referred to above have been adjusted by any automatic means coacted therewith which require to be manually retracted and reinserted in the oven.

An additional object of the invention contemplates the provision and arrangement of connecting means for the ejecting apparatus and oven door having detachable connection therewith to facilitate ejecting one or more of the oven trays.

With the above and other objects in view, the invention further consists of the following novel features and details of construction, to be hereinafter more fully described, illustrated in the accompanying drawings and pointed out in the appended claims.

In the drawings:—

Figure 1 is a longitudinal sectional view taken on line 1—1 of Figure 3.

Figure 2 is a longitudinal sectional view taken on line 2—2 of Figure 3.

Figure 3 is a sectional view taken on line 3—3 of Figure 2.

Figure 4 is a fragmentary detailed sectional view of means for connecting the attachment with an oven door.

The oven comprises side walls 1, a top wall 2, and a rear wall 3 and a bottom 4, and the oven is open at its front and a door 5 is hinged as at 6 at the lower side of the door opening and is provided with a handle 7 whereby it may be conveniently swung into and out of position closing the open front of the oven, or in other words, the door opening of the oven. The numerals 8 and 9 indicate, in general, the two shelves of the attachment which are mounted within the oven, in a manner which will presently be described, in order to support loaves of bread, biscuits, cakes, pies, or in fact, any food product which is to be baked. In order that the shelf 8 may be supported for sliding movement into and out of the oven and firmly supported when in sustaining position, a number of rollers 10 are mounted upon the inner side of each side wall 1 of the oven. A rack bar 11 is mounted at each side of the shelf 8 and a gear 12, fixed upon the shaft 13 mounted in a suitable bearing within the oven, is in mesh with each of the said rack bars. A segmental gear 14 is arranged at each side of the interior of the oven and mounted upon a shaft 15 and this segmental gear is in mesh with a pinion 16 which is mounted upon the shaft 13 beside the gear 12.

In order to effect outward sliding of the two shelves, simultaneously with each other, automatically, upon opening of the oven door, a telescopic bar, indicated in general by the numeral 17 and comprising an upper section 18 and a lower section 19, is provided, and the upper section 18 is of substantially tubular form and is formed in its under side and near its lower end with a longitudinal slot 20 and a screw 21 is threaded into the under side of the section 19 and works in this slot, the screw being headed so as to prevent any separation of the parts. The section 18 is mounted at its upper end upon a shaft 22 which extends transversely within the oven substantially at the top thereof, and the lower end of each section 19 is connected to an upstanding bracket member 23 mounted at the respective side of the lower shelf 9. A spring 24 is preferably arranged within the tubular section 18 of the telescopic connecting rod and this spring acts so as to influence the relative sliding movement of the telescopic sections of the said rod. Connected pivotally, as indicated by the numeral 25, to the section 18 of the telescopic connecting rod 17, is a link 26 carrying at its other end a pivot pin 28 projecting within a slot 28' in a connecting bar 29, this bar being pivotally connected at one end with a link 30, as indicated by the numeral 31.

The operating mechanism, aside from the pinion and rack connections including the segmental gear, for the uppermost tray 8, consists of a swingably mounted link member 33 pivoted to one of the side walls 1 at its uppermost end and depends therefrom to one side of the tray 8 for pivotal connection with drag links 34 and 35 respectively. The drag link 35, pivotally connected with the segmental gear 14 and the link 34, after the manner of the link 26, carries a cross pin 36 at its opposite end for accommodation within a slot 37 in a connecting bar 38 pivotally mounted, as at 39, within the oven structure and to one side of the tray 8. A drag link 40, pivotally connected as at 41 to the opposite end of the connecting bar 38 is associated after the manner of the drag link 30 with knobs 42 revolvably mounted within the oven door 5. The connections, however, between the drag links 30 and 40 with the knobs 42, are detachable ones in view of the fact that pin and bayonet slot connections are established therebetween.

In this manner the ejecting apparatus for either or both of the trays may be released, by turning of the knobs 42 precedent to the opening of the door 5.

Although only one set of linkages are employed for the individual trays between the ejecting apparatus and knobs, it is obviously apparent that binding action will not occur between the walls of the housing and the trays inasmuch as the segmental gears are connected for synchronous movement.

As noted from the illustrations of the invention in Figures 1 and 2 of the drawings, the lowermost tray 9 is provided with roller members 43 mounted for traveling movement therewith as the tray is extended and retracted.

It will also be evident, from the foregoing description of the invention, that the process of baking bread and the like, and the placing of the same within the oven and its removal therefrom may be greatly expedited by the use of the invention and furthermore, due to the fact that both of the shelves are automatically shifted to a substantially fully extended position, the condition of the food production, supported upon each shelf, may be more conveniently noted, than would be possible by merely glancing into the oven by opening of the door and without any displacement of the supporting shelves of the oven.

The invention is susceptible of various changes in its form, proportions and minor details of construction and the right is herein reserved to make such changes as properly fall within the scope of the appended claims.

Having described the invention what is claimed is:—

1. An oven attachment comprising a frame adapted to fit in the oven, a plurality of rollers mounted upon the side walls of the frame, shelves for the frame, one of the shelves being slidably supported upon said rollers, a shaft mounted transversely of the frame and having gears adjacent the ends thereof, rack teeth upon the mentioned shelf at the opposite sides thereof having meshing engagement with the gears, linkage connections between the other shelf and gears, and means actuated through movement of the door for imparting motions to the gears and linkage connections to effect sliding movement of the shelves.

2. An oven attachment comprising a frame adapted to fit in the oven, a plurality of rollers mounted upon the side walls of the frame, shelves for the frame located at different levels therein, one of the shelves being slidably supported upon said rollers, a shaft mounted transversely of the frame having gears upon the ends thereof, rack teeth upon the mentioned shelf at the opposite sides thereof and in meshing engagement with said gears, operative gear connection between the first and last mentioned gears, linkage connection between the other shelf and the gears, and means actuated through the movement of the door of the oven to open and closed position for imparting rotary motion to the first mentioned gears and shifting motion to the linkage connections to effect sliding movement of the shelves, and operating bars detachably connected with the linkages and door.

3. An oven attachment comprising a frame adapted to fit in the oven, a series of rollers mounted upon the side walls of the frame, upper and lower shelves mounted in the frame, one of the said shelves being slidably mounted upon said rollers, a shaft mounted transversely of the frame, gears mounted upon said shaft adjacent the ends thereof, rack teeth upon the mentioned shelf at opposite sides thereof, gears meshing with the rack teeth, operative gear connection between the first and last mentioned gears, telescopic rods pivotally mounted at their upper ends from the side walls of the frame, the outer ends of the lower section of each telescopic rod being pivotally connected with the lower shelf, arms extending from the door of the oven at each side thereof, linkage establishing pivotal conections between the gears and telescopic rod and arms, and knobs adapted to be mounted upon the door and having detachable connections with the arms.

In testimony whereof, I affix my signature.

MORRIS OLSEN.